(12) United States Patent
Das

(10) Patent No.: US 7,565,996 B2
(45) Date of Patent: Jul. 28, 2009

(54) TRANSIENT LIQUID PHASE BONDING USING SANDWICH INTERLAYERS

(75) Inventor: Gopal Das, Simsbury, CT (US)

(73) Assignee: United Technologies Corp., East Hartford, CT (US)

( * ) Notice: Subject to any disclaimer, the term of this patent is extended or adjusted under 35 U.S.C. 154(b) by 511 days.

(21) Appl. No.: 10/957,805

(22) Filed: Oct. 4, 2004

(65) Prior Publication Data
US 2006/0071056 A1 Apr. 6, 2006

(51) Int. Cl.
*B23K 35/12* (2006.01)
*B23K 35/24* (2006.01)

(52) U.S. Cl. .................. 228/246; 228/248.1; 228/262.3

(58) Field of Classification Search .................. None
See application file for complete search history.

(56) References Cited

U.S. PATENT DOCUMENTS

| | | | |
|---|---|---|---|
| 4,008,844 A | 2/1977 | Duvall et al. | |
| 4,038,041 A | 7/1977 | Duvall et al. | |
| 4,073,639 A * | 2/1978 | Duvall et al. | 75/255 |
| 4,122,992 A * | 10/1978 | Duvall et al. | 228/176 |
| 4,250,229 A | 2/1981 | Kear et al. | |
| 4,326,833 A | 4/1982 | Zelahy et al. | |
| 4,676,843 A * | 6/1987 | Nazmy | 419/8 |
| 4,700,881 A * | 10/1987 | Ryan | 228/194 |
| 4,988,035 A * | 1/1991 | Ueno et al. | 228/175 |
| 5,221,039 A | 6/1993 | Jung et al. | |
| 5,372,298 A * | 12/1994 | Glaeser | 228/195 |
| 5,806,751 A | 9/1998 | Schaefer et al. | |
| 5,836,075 A * | 11/1998 | Fitzgerald et al. | 29/889.2 |
| 6,004,683 A | 12/1999 | Rafferty et al. | |
| 6,098,871 A | 8/2000 | Cairo et al. | |
| 6,199,751 B1 * | 3/2001 | Gaynes et al. | 228/195 |
| 6,508,000 B2 * | 1/2003 | Burke et al. | 29/889.1 |
| 6,638,639 B1 | 10/2003 | Burke et al. | |
| 2003/0136811 A1 | 7/2003 | Philip | |
| 2005/0067061 A1 * | 3/2005 | Huang et al. | 148/428 |
| 2005/0072830 A1 * | 4/2005 | Ditzel et al. | 228/56.3 |

FOREIGN PATENT DOCUMENTS

| | | |
|---|---|---|
| EP | 0 278 030 A | 8/1988 |
| JP | 2000 263247 A | 9/2000 |

OTHER PUBLICATIONS

Extended European Search Report dated Feb. 7, 2006.

* cited by examiner

*Primary Examiner*—Kiley Stoner

(57) ABSTRACT

Systems and methods for transient liquid phase bonding are described herein. Embodiments of these systems and methods utilize sandwich interlayers to produce stronger, more homogeneous bonds than currently possible. These sandwich interlayers have a middle bonding layer sandwiched between two outer bonding layers. The middle bonding layer is a different composition, and may even be a different form, than the outer bonding layers. In embodiments, these sandwich interlayers may be used to join a single crystal material to a polycrystalline material to make a gas turbine engine component, such as an integrally bladed rotor.

39 Claims, 5 Drawing Sheets

TRANSIENT LIQUID PHASE BONDING USING SANDWICH INTERLAYERS

STATEMENT REGARDING FEDERALLY SPONSORED RESEARCH OR DEVELOPMENT

The U.S. Government may have certain rights in this invention pursuant to Contract Number F33615-98-C-2823 with the United States Air Force.

FIELD OF THE INVENTION

The present invention relates generally to bonding techniques. More specifically, the present invention relates to sandwich interlayers for use in transient liquid phase bonding.

BACKGROUND OF THE INVENTION

Various items, such as gas turbine engine components, can be manufactured by joining individually fabricated segments together to form a single, unitary component. Cracks or other damage in such components may also be repaired. Diffusion bonding, which involves the solid-state movement of atoms and grain growth across a joint interface, has been used to join and/or repair such components. Diffusion bonding allows for the fabrication and repair of complex assemblies having bonded areas that are practically indistinguishable from the adjacent segment materials, even under close metallurgical examination. These bonds comprise microstructures and mechanical properties that are substantially similar to those of the segments being joined together. However, diffusion bonding requires high pressures, which can cause distortion of the components.

Transient liquid phase bonding is a hybrid brazing and diffusion bonding process that overcomes the presence of weaker filler material typically associated with braze joints by also utilizing diffusion bonding. In transient liquid phase bonding, one or more interlayer materials are disposed between two or more segments being joined together to form an assembly. When the assembly is heated to the bonding temperature, the interlayer materials melt, filling in the gaps between the segments. While the assembly is held at the bonding temperature, interdiffusion of certain alloying elements occurs between the interlayer and the adjacent segments, causing a compositional change at the joint, which isothermally solidifies the joint and creates an initial bond between the segments. Holding the assembly at the bonding temperature for a longer period of time allows a substantially homogenous diffusion bond to form between the segments. Transient liquid phase bonding requires very low pressures, and therefore does not cause distortion of the components. This makes transient liquid phase bonding an attractive assembly and/or repair method.

Current transient liquid phase bonding systems and methods do not produce sufficiently strong bonds between substrates for some applications. Therefore, it would be desirable to be able to produce stronger bonds when utilizing transient liquid phase bonding techniques. It would also be desirable to improve the hardness, microstructure, and/or homogeneity (chemical and/or microstructural) of such bonds. It would be further desirable to be able to join dissimilar materials by utilizing such techniques.

SUMMARY OF THE INVENTION

Accordingly, the above-identified shortcomings of existing systems and methods are overcome by embodiments of the present invention, which relates to transient liquid phase bonding systems and methods. These systems and methods utilize sandwich interlayers to form stronger, more homogeneous bonds than currently possible with existing transient liquid phase systems and methods. These sandwich interlayers also allow finer microstructures and more uniform hardnesses to be obtained in such bonds.

Embodiments of this invention comprise systems for bonding substrates via transient liquid phase bonding. Embodiments of these systems comprise: two outer bonding layers; a middle bonding layer sandwiched or disposed between the two outer bonding layers, the middle bonding layer comprising a different composition than the outer bonding layers. During bonding, the outer bonding layers melt, but the middle bonding layer does not melt.

In embodiments, the composition of the middle bonding layer may be substantially similar to a composition of a substrate being bonded. The middle bonding layer may comprise a first form, and the outer layers may comprise a second form, with the first form and the second form being different from one another. Each outer bonding layer may comprise powder, a paste, a cloth, a tape, or a foil sheet; and the middle bonding layer may comprise a powder, a paste, a cloth, a tape, or a foil sheet; but the outer bonding layers and the middle bonding layer do not all comprise foil sheets. In embodiments, each outer bonding layer may be about 25-50 microns thick, and the middle bonding layer may be about 75-100 microns thick.

Embodiments of this invention also comprise methods for joining substrates together via transient liquid phase bonding. These methods may comprise: providing two or more substrates to be joined together; disposing a sandwich bonding assembly between the substrates to be joined together, the sandwich bonding assembly comprising a middle bonding layer sandwiched between two outer bonding layers, the middle bonding layer being a different composition from the outer bonding layers; heating the sandwich bonding assembly and the substrates to a predetermined temperature; and holding the sandwich bonding assembly and the substrates at the predetermined temperature for a predetermined amount of time.

Embodiments of this invention also comprise methods for repairing a substrate via transient liquid phase bonding. These methods may comprise: positioning a sandwich bonding assembly in a desired location with respect to the substrate, the sandwich bonding assembly comprising a middle bonding layer sandwiched between two outer bonding layers, the middle bonding layer comprising a different composition than the outer bonding layers; heating the substrate and sandwich bonding assembly to a predetermined temperature; holding the substrate and sandwich bonding assembly at the predetermined temperature for a predetermined amount of time.

The predetermined temperature comprises a temperature above the melting point of the outer bonding layers, below the melting point of the middle bonding layer, and below the melting point of the substrates. The predetermined amount of time comprises enough time to at least substantially melt the outer bonding layers. The predetermined amount of time further comprises an amount of time sufficient to form a joint between the substrates being joined together by allowing the melted outer bonding layers to solidify. The predetermined amount of time further comprises an amount of time sufficient to allow the joint to at least substantially homogenize. In embodiments, the predetermined amount of time may be about 4 hours.

This invention may be used to join similar or dissimilar substrates together, and/or to repair damaged substrates (i.e., repair cracks). In embodiments, this invention may be used to join a single crystal substrate to a polycrystalline substrate, such as, for example, to create a gas turbine engine component. In such embodiments, each outer bonding layer may comprise a sheet of MBF 80 nickel-based brazing foil, and the middle bonding layer may comprise a powder having the following nominal composition: 60 wt. % Ni, 12.4 wt. % Cr, 185 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

Further features, aspects and advantages of the present invention will be readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which.

DETAILED DESCRIPTION OF THE INVENTION

For the purposes of promoting an understanding of the invention, reference will now be made to some preferred embodiments of this invention as illustrated in FIGS. 1-5 and specific language used to describe the same. The terminology used herein is for the purpose of description, not limitation. Specific structural and functional details disclosed herein are not to be interpreted as limiting, but merely as a basis for teaching one skilled in the art to variously employ the present invention. Any modifications or variations in the depicted structures and methods, and such further applications of the principles of the invention as illustrated herein, as would normally occur to one skilled in the art, are considered to be within the spirit and scope of this invention.

This invention relates to sandwich interlayers for use in transient liquid phase bonding systems and methods. These sandwich interlayers produce better bonds than can currently be produced with existing transient liquid phase bonding systems and methods. Furthermore, bonds produced with these sandwich interlayers have improved strength and hardness, finer microstructures, and are more homogeneous than bonds formed with existing transient liquid phase bonding systems and methods.

Embodiments of this invention comprise transient liquid phase bonding systems and methods for joining two or more substrates together by utilizing sandwich interlayers having multiple melting point depressant layers therein. Embodiments of this invention can also be used to repair damaged substrates. As previously noted, transient liquid phase ("TLP") bonding is a type of brazing and diffusion bonding process wherein interlayer materials are disposed between substrates being bonded to form an assembly. TLP bonding allows a bond to be formed at a low temperature, while the remelting temperature of the resulting bond is much higher. When the assembly is held together and heated to the bonding temperature, at least some of the interlayer materials melt, filling in the gaps between the substrates. While the assembly is held at the bonding temperature, interdiffusion of certain alloying elements occurs between the interlayer and the substrates, causing a compositional change at the joint, which isothermally solidifies the joint and creates an initial bond between the substrates. Holding the assembly at the bonding temperature for a longer period of time allows a diffusion bond having a substantially homogenous microstructure to form between the substrates.

High precision TLP bonding may be used to produce high quality chemically and microstructurally homogeneous bonds between similar or dissimilar substrates. The sandwich interlayers of this invention can be used for joining or repairing, via TLP bonding, any suitable substrates. These substrates may comprise any composition, and may comprise any single crystal material, polycrystalline material, directionally solidified material, and/or combinations thereof.

Figure 1:
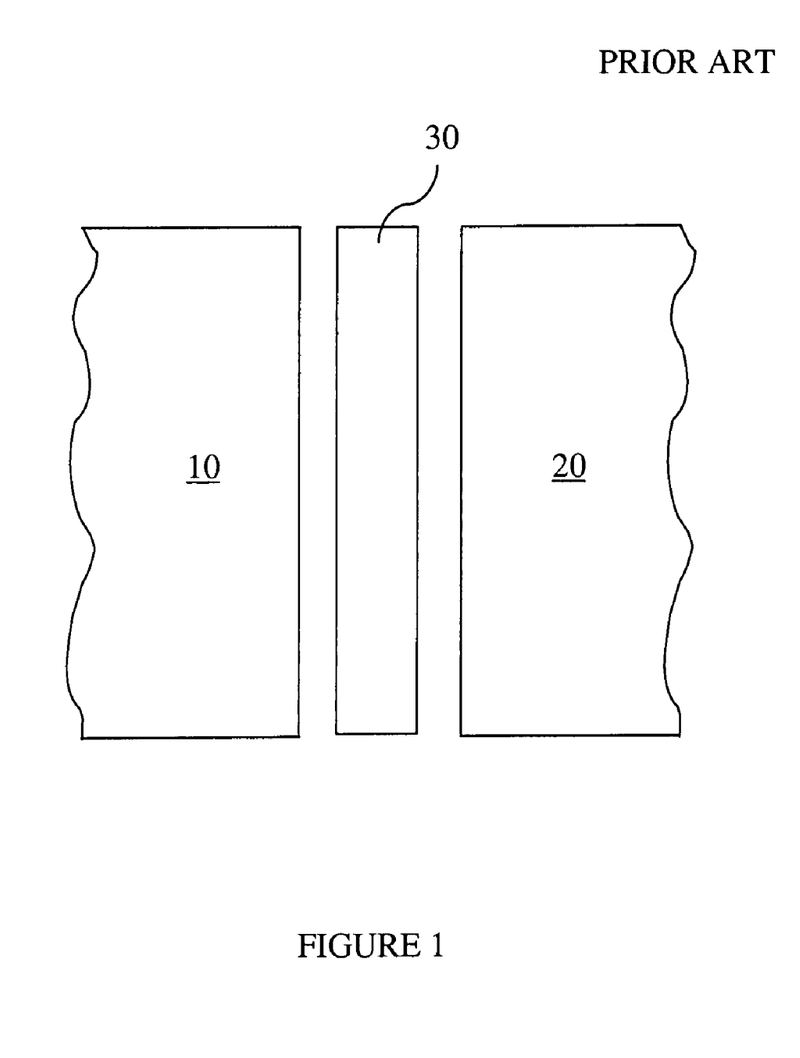
FIG. 1 is a schematic diagram showing how a single crystal substrate can be joined to a polycrystalline substrate via a thin foil interlayer, as commonly utilized in the prior art.

Existing TLP bonding systems and methods utilize various forms of bonding medium, such as, for example, thin foils, powders, pastes, cloths, tapes, honeycombs, thin coatings, etc. FIG. 1 shows a typical existing TLP bonding configuration, where a single interlayer 30 (i.e., a thin sheet of foil) is positioned between a single crystal substrate 10 and a polycrystalline substrate 20 to form a joint interface therebetween. While this configuration produces a good bond, stronger and better bonds are possible with the sandwich interlayers of this invention.

Figure 2:
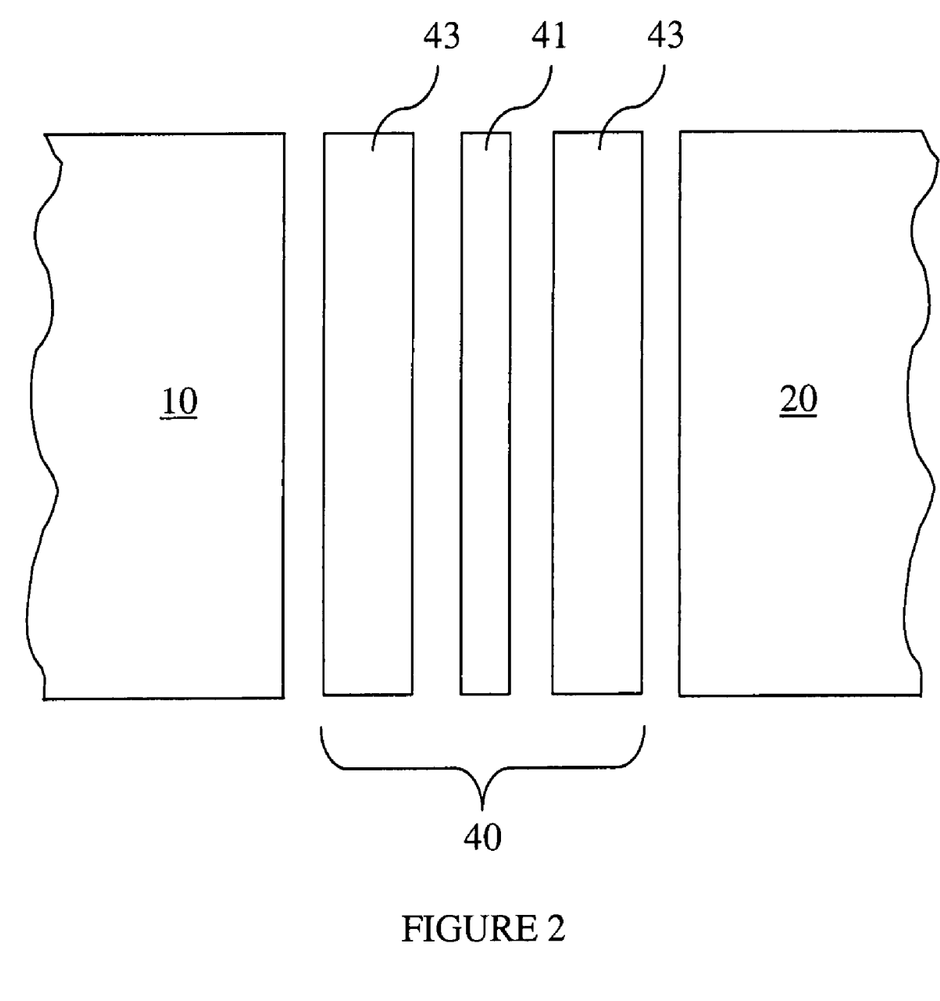
FIG. 2 is a schematic diagram showing how a single crystal substrate can be joined to a polycrystalline substrate via an exemplary sandwich interlayer, as utilized in embodiments of this invention.

FIG. 2 shows an exemplary TLP bonding configuration of this invention. As shown herein, a sandwich interlayer 40 is positioned between a single crystal substrate 10 and a polycrystalline substrate 20 to form a joint interface therebetween. This sandwich interlayer 40 comprises a middle bonding layer 41 sandwiched between two outer bonding layers 43, where the middle bonding layer 41 comprises a different composition than the outer bonding layers 43. The middle bonding layer 41 may also comprise a different form than the outer bonding layers 43. For example, in some non-limiting embodiments, the middle bonding layer 41 may comprise a powder, and the outer bonding layers 43 may comprise foil sheets, where the powder and the foil sheets comprise different compositions. In other non-limiting embodiments, the middle bonding layer 41 and outer bonding layers 43 may comprise the same form (i.e., powder), but comprise different compositions. Numerous other combinations are also possible.

The outer bonding layers 43 may be of any suitable thickness and may comprise any suitable form, such as, for example, powder, paste, cloth, tape, foil sheets, etc. For example, in embodiments, the outer bonding layers 43 may comprise foil sheets about 25-50 microns thick.

The middle bonding layer 41 may also be of any suitable thickness and may comprise any suitable form, such as, for example, powder, paste, cloth, tape, foil sheet, etc. Any binder that may be included in the middle bonding layer 41 (i.e., if a paste or tape is used) should be capable of evaporating without leaving any deleterious residue behind. In embodiments, the middle bonding layer 41 may comprise a layer of powder about 100 microns thick. In embodiments, the middle bonding layer 41 may comprise a blend of powders, wherein a powder of each substrate being joined is blended together to form a single blended powder comprising the compositions of the substrate being joined.

To facilitate the fabrication of a joint having strength properties comparable to those of the substrates being joined, it is desirable to use sandwich interlayers 40 having a relatively small thickness. If the sandwich interlayer 40 thickness is too great, the mechanical properties of the joint may not be acceptable. Therefore, in embodiments, the total sandwich interlayer 40 has a maximum thickness of about 250 microns.

The sandwich interlayer 40 (middle bonding layer 41 and outer bonding layers 43) should be capable of forming a metallurgical bond with the substrates 10, 20 once the outer bonding layers 43 melt and solidify so that sufficient bond strength can be achieved. If there is no metallurgical bond, the joint will have insufficient strength. Therefore, the composition of the materials used in the sandwich interlayer 40 should be tailored to the substrates being joined. The compositions of the middle bonding layer 41 and the outer bonding layers 43 may comprise any compositions that are mechanically and/or chemically suited for use with the substrates being joined or repaired, so that the composition of the bond formed therewith is essentially similar to at least one of the substrates being joined or repaired. Elements whose presence is required in the finished bond area, and whose solid-state diffusion rates are slow, are desirably included in the materials used in the sandwich interlayer 40. On the other hand, elements whose presence may adversely affect the bonding process and/or the quality of the finished joint are desirably excluded from the materials of the sandwich interlayer 40. For example, some elements present in the substrates being joined may be excluded from the sandwich interlayer 40 materials to prevent the formation of brittle, difficult-to-eliminate phases in the bond. In embodiments, the middle bonding layer 41 may comprise a composition that matches, or that is substantially similar to, the composition of at least one of the substrates being bonded.

Alloying additions may be included in the sandwich interlayer 40 materials for various purposes. For example, hafnium may be included in the middle bonding layer 41 to help impart grain boundary ductility to the bond region. Also for example, the composition of the outer bonding layers 43 may comprise a melting point depressant therein, which lowers the melting point of the composition to a temperature below the melting point of the substrates 10, 20 being bonded, and below the melting point of the middle bonding layer 41, thereby permitting local melting of the outer bonding layers 43 and subsequent isothermal solidification of the bond that is formed therewith. Isothermal solidification of the bond occurs because the melting point depressant in the outer bonding layers 43 diffuses into the adjacent substrates 10, 20, thereby reducing the quantity of the melting point depressant in the joint to the point where solidification occurs even though the temperature has remained constant. As time at temperature increases, the melting point depressant in the interlayer 40 moves into the substrates 10, 20 being joined according to the well-known laws of diffusion, creating a concentration gradient. The highest concentration of the melting point depressant remains at the center of the melted joint, and decreases toward the interface between the substrates and the joint. When the critical value of the melting point depressant concentration is reached in the joint, isothermal solidification of the joint commences. Boron is particularly advantageous for use as a melting point depressant in bonding or repairing gas turbine engine components because it is capable of rapidly diffusing into the superalloys commonly used for such components.

The melting point depressant may be present in any amount sufficient to liquefy the outer bonding layers 43 at the desired bonding temperature. There must be a sufficient amount of liquid phase present at the desired bonding temperature to assure that the entire bonding area is filled enough to create a void-free finished joint. In embodiments, the melting point depressant may comprise about 1-10 weight percent boron, but this amount may vary depending on the substrates being bonded and the materials being used in the sandwich interlayer 40. For example, in embodiments, the melting point depressant comprises about 3 weight percent boron.

The difference in melting points between the outer bonding layers 43 and the substrates 10, 20 being bonded should be great enough to allow the outer bonding layers 43 to liquefy sufficiently to flow and fill the joint at a temperature that does not adversely affect the substrates 10, 20. In some cases, the melting point of the outer bonding layers 43 may need to be about 60° C. below that of the substrates 10, 20. However, a narrower melting point difference may be acceptable in other cases, while a broader melting point difference may be necessary in other cases in order to avoid exposing the substrates to temperatures where deleterious effects on the substrates may be realized.

The form of the sandwich interlayer 40, and the composition of the materials used therein, may be determined by the end application of the substrate(s) being bonded. In some applications, substantially complete homogenization and development of a bonded area that essentially corresponds to the component composition and microstructure may be absolutely essential. In other applications, a much lesser degrees of composition and microstructure matching may be acceptable.

The sandwich interlayers 40 of this invention may be used to fabricate new components having high quality, high strength bonds therein. Such components may comprise hollow fan blades, integrally bladed rotors, high and low pressure turbine blades, high pressure compressor blades, and other gas turbine engine components. These sandwich interlayers 40 can be used to join either similar or dissimilar substrates together. For example, instead of requiring the complicated fir tree and slot attachment mechanisms currently in use, single crystal gas turbine engine blades may be joined to polycrystalline disks/rotors via the systems and methods of this invention to produce integrally bladed rotors, which weigh significantly less than existing rotor blade assemblies.

In addition to fabricating new components, damaged portions of components may also be repaired via the TLP bonding systems and methods of this invention. For example, a damaged portion of a component may be removed, and a replacement portion therefor may be inserted into the component. The replacement portion may then be joined to the existing portion of the component via the sandwich interlayers 40 of this invention. Cracks may also be repaired with the sandwich interlayers 40 of this invention. Since very low pressures are required to join components via this invention, distortion and residual stresses are not created during the joining process.

Proper heat treating such components after bonding creates a repaired component that has a structural bond therein that very closely resembles the original component material in structure, mechanical properties, and performance.

EXAMPLES

The systems and methods of this invention were evaluated by preparing and comparing two TLP bonded joints, each joint joining a single crystal substrate to a polycrystalline substrate. The first joint utilized known transient liquid phase bonding systems and methods, while the second joint utilized a transient liquid phase bonding system and method of this invention. The single crystal substrate utilized in these samples comprised a material commonly used to make gas turbine engine blades which has the following nominal composition: 3-12 wt. % Cr, 0-3 wt. % Mo, 3-10 wt. % W, 0-5 wt. % Re, 6-12 wt. % Ta, 4-7 wt. % Al, 0-15 wt. % Co, 0-0.02 wt. % B, 0-0.1 wt. % Zr, 0-0.0045 wt. % C, 0-0.8 wt. % Hf, 0-2 wt. % Cb/Nb, 0-1 wt. % V, 0-0.7 wt. % Ti, 0-10 wt. % (Ru+Ir+Pt+Pd+Rh+Os), 0-0.1 wt. % (Y+La+Sc+Ce+lanthanides+actinides), balance Ni. The polycrystalline substrate utilized in these samples comprised a material typically used to make gas turbine engine disks/rotors, which has the following nominal composition: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

Example 1

In this first sample, a single sheet of MBE 80 nickel-based brazing foil was utilized as the single interlayer 30 to join the single crystal substrate 10 to the polycrystal line substrate 20, as shown in FIG. 1. The amorphous sheet of MBF 80 nickel-based brazing foil was about 25 microns thick, and had a nominal composition of: 79.3 wt. % nickel, 15.3 wt. % chromium, 1.5 wt. % iron, 0.1 wt. % cobalt, 0.1 wt. % titanium, 0.1 wt. % aluminum, 3.7 wt. % boron 0.1 wt. % carbon. This commercially available MBF 80 nickel-based brazing foil was selected to provide approximately uniform chemical distribution across the bond region after solidification thereof. The boron in this sheet is a melting point depressant which allows the MBF 80 nickel-based brazing foil, to melt at about 1940° F., which is below the gamma prime solvus temperatures for both the single crystal substrate 10 and the polycrystalline substrate 20 utilized here.

TLP bonding was accomplished in this sample at a temperature of about 2065° F., under 60 psi in vacuum, for about 4 hours. This temperature is above the melting point of the single interlayer 30, but below the melting points of the substrates 10, 20. Thereafter, post-bond heat treating was performed to form gamma prime precipitates in the bond. Heat treating comprised heating the assembly to about 2065° F., holding it there for about 4 hours, and then cooling it to room temperature at a rate of about 90° F./min.

During bonding, the MBF 80 nickel-based brazing foil interlayer 30 melted, and the boron therein diffused into the single crystal material 10 and the polycrystalline material 20, thereby minimizing the deleterious betide formation in the bond 35 and adjacent areas. With the exception of chromium, this MBF 80 nickel-based brazing foil interlayer 30 was essentially devoid of alloying elements that provide strength through solid solution and gamma prime formation to the substrates. However, such alloying elements were present in the substrates 10, 20, and during bonding, these elements diffused from the substrates 10, 20 into the bond 35, thereby strengthening the bond 35.

Figure 3:
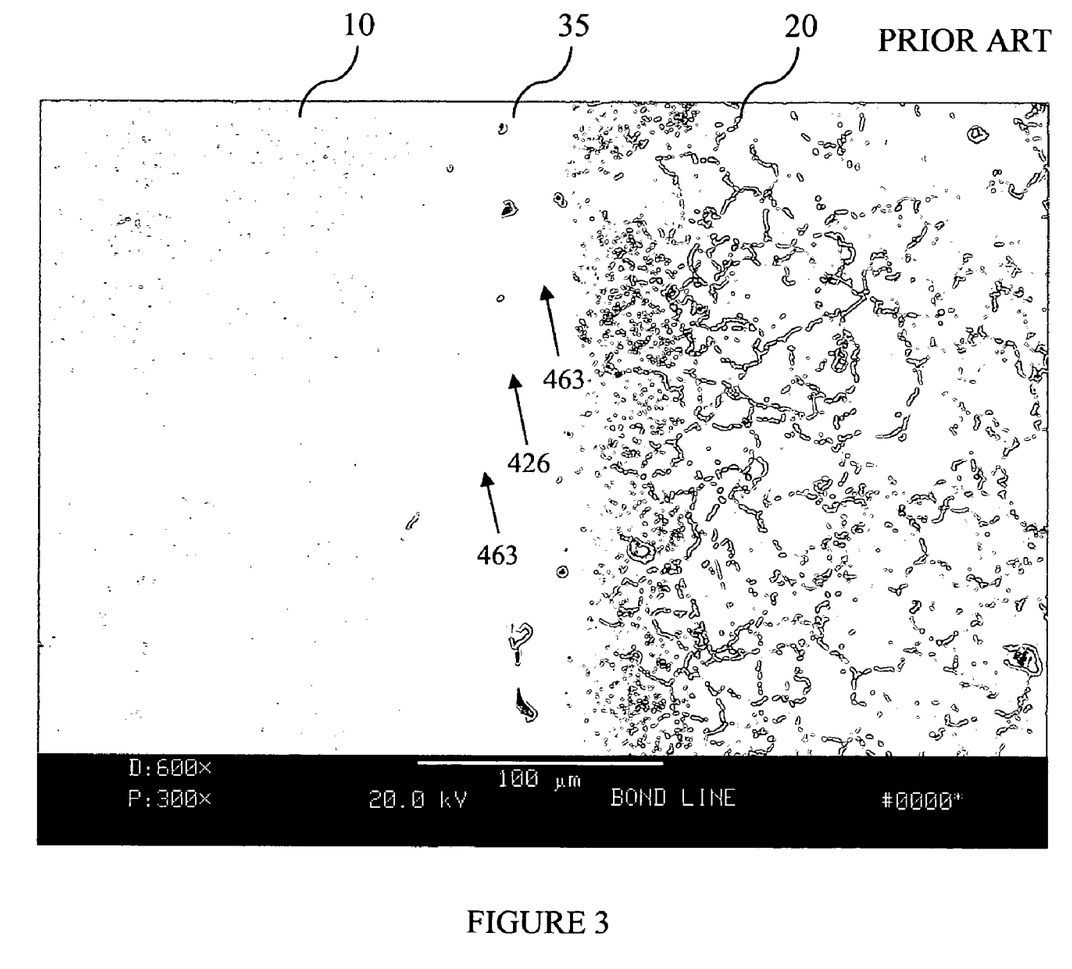
FIG. 3 is an SEM micrograph showing a single crystal substrate joined to a polycrystalline substrate via a thin foil interlayer as depicted in FIG. 1.

A near defect-free coarse-grained microstructure developed in this bond 35, as shown in FIG. 3. This coarse-grained microstructure may imply lower bond strength, which may adversely affect mechanical properties (i.e., fatigue) of the bond 35. Once bonded, there was a noticeable dip in hardness in the center of this bond. As shown in FIG. 3, the hardness at the edges of the bond was about 463 Vicker's Hardness Number (VHN), but in the center of the bond was about 426 VHN. This dip in hardness may suggest that diffusion of the alloying elements from the substrates 10, 20 into the bond 35 leveled off at the center of the bond 35.

Example 2

In this second sample, an exemplary sandwich interlayer 40 of this invention was utilized to join the single crystal substrate 10 to the polycrystalline substrate 20, as shown in FIG. 2. The sandwich interlayer 40 comprised two outer layers 43 and a middle layer 41 sandwiched between the two outer layers 43. Each outer layer 43 comprised an amorphous sheet about 25 microns thick of the same MBF 80 nickel-based brazing foil used in Example 1. The middle layer 41 comprised a layer of 10 micron powder about 100 microns thick having the following nominal composition: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B. The total thickness of this sandwich interlayer 40 was about 150 microns thick, and the final bonded area was about 250 microns thick due to coarsening during bonding.

The same bonding parameters as utilized in Example 1 were utilized here. As before, TLP bonding was accomplished at a temperature of about 2065° F., under 60 psi in vacuum, for about 4 hours. Thereafter, post-bond heat treating was performed to form gamma prime precipitates in the bond. Heat treating comprised heating the assembly to about 2065° F., holding it there for about 4 hours, and then cooling it to room temperature at a rate of about 90° F./min.

During bonding, as the MBF 80 nickel-based brazing foil sheets 43 melted, the powder 41 was incorporated into the bond 45 such that the overall composition of the bond 45 became close to that of the polycrystalline substrate 20. The powder 41 that was used in this sandwich interlayer 40 had more solid solution strengtheners and gamma prime formers than the interlayer 30 of Example 1, thereby providing this bond 45 with enhanced strength as compared to the bond 35 in Example 1.

Figure 4:
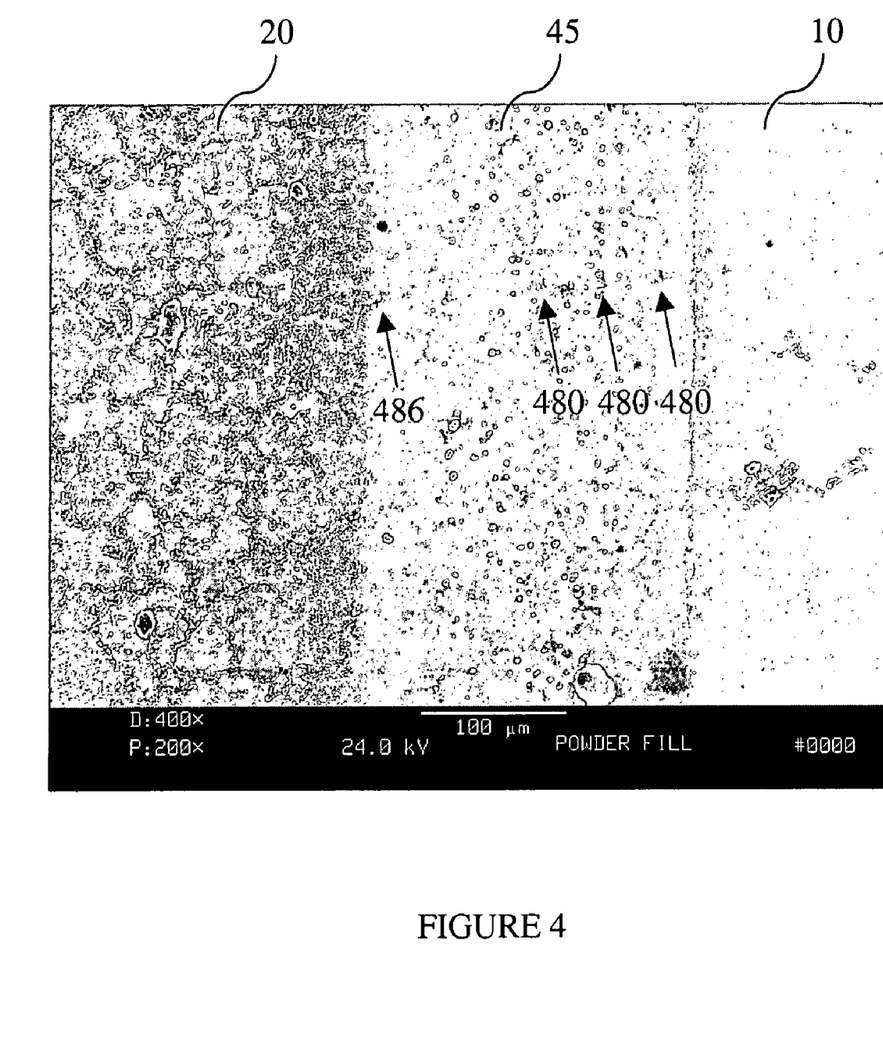
FIG. 4 is an SEM micrograph showing a single crystal substrate joined to a polycrystalline substrate via an exemplary sandwich interlayer as depicted in FIG. 2.
Figure 5:
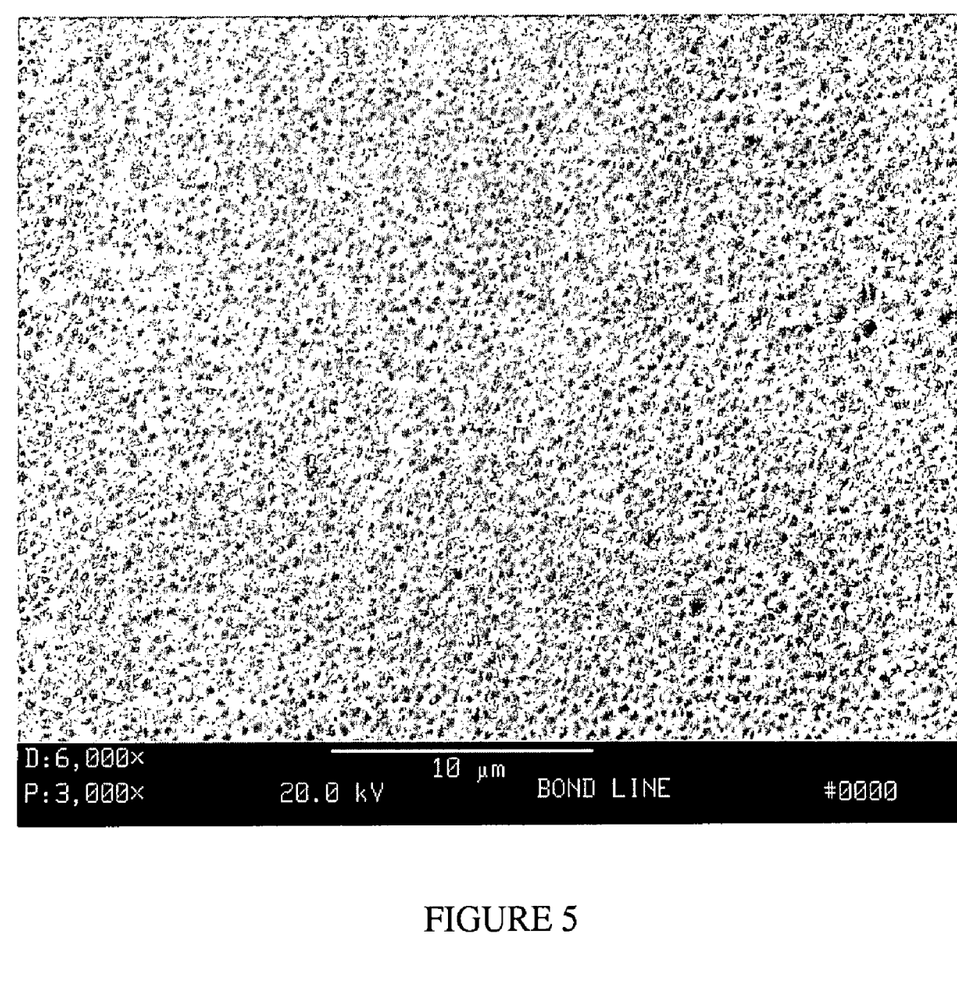
FIG. 5 is an SEM micrograph showing, at higher magnification, the fine-grained gamma microstructure of the bond shown in FIG. 4.

A fine-grained gamma microstructure developed at this bond 45, as shown in FIGS. 4 and 5. Unlike the bond 35 of Sample 1, the bond 45 of Sample 2 had nearly uniform hardness of about 480 VHN throughout, as shown in FIG. 4. Although mechanical properties such as tensile, fatigue, creep and impact properties for the bond of Example 2 were not evaluated, the enhanced hardness and finer microstructure of Example 2 indicate that the bond 45 of Example 2 is superior to the bond 35 of Example 1.

As described above, this invention provides improved transient liquid phase bonding systems and methods. Advantageously, these systems and methods utilize sandwich interlayers to form stronger, more homogenous bonds than currently possible with existing transient liquid phase bonding systems and methods. These sandwich interlayers may be used to join substrates of any compositions together, whether similar or dissimilar. These sandwich interlayers also allow finer microstructures and more uniform hardnesses to be obtained in such bonds. Many other embodiments and advantages will be apparent to those skilled in the relevant art.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, these sandwich interlayers may be used to join either similar or dissimilar substrates together, or they may be used to repair damaged substrates. Thus, it is intended that the present invention cover all suitable modifications and variations as come within the scope of the appended claims and their equivalents.

What is claimed is:

1. A system for bonding substrates via transient liquid phase bonding, comprising:
   two outer bonding layers; and
   a middle bonding layer disposed between the two outer bonding layers;
   wherein the composition of the middle bonding layer is substantially similar to a composition of at least one substrate being bonded, and wherein each outer bonding layer comprises a sheet of nickel-based brazing foil having a nominal composition 79.3 wt. % nickel, 15.3 wt. % chromium, 1.5 wt. % iron, 0.1 wt. % cobalt, 0.1 wt. % titanium, 0.1 wt. % aluminum, 3.7 wt, % boron, 0.1 wt. % carbon, and wherein the middle bonding layer comprises a powder having the following nominal composition: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt % B.

2. The system of claim 1, wherein each outer bonding layer is about 25-50 microns thick.

3. The system of claim 1, wherein the middle handing layer is about 75-100 microns thick.

4. The system of claim 1, wherein the substrates being bonded comprise a single crystal substrate being joined to a polycrystalline substrate.

5. The system of claim 1, wherein the substrate being bonded is: (a) being joined to another substrate, or (2) a damaged substrate that is being repaired.

6. A sandwich bonding assembly for transient liquid phase bonding comprising a middle bonding layer sandwiched between two outer bonding layers, wherein the middle bonding layer comprises a different composition than the outer bonding layers, the outer bonding layers melt during bonding, and the middle bonding layer does not melt during bonding, wherein each outer bonding layer comprises a sheer of nickel-based brazing foil having a nominal composition 79.3 wt. % nickel, 15.3 wt. % chromium, 1.5 wt. % iron, 0.1 wt. % cobalt, 0.1 wt. % titanium, 0.1 wt. % aluminum, 3.7 wt. % boron, 0.1 wt. % carbon and the middle bonding layer comprises a powder having the following nominal composition: 60 wt, % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

7. The sandwich bonding assembly of claim 6, wherein a composition of the middle bonding layer is substantially similar to a composition of a substrate being bonded by the sandwich bonding assembly.

8. A method for joining substrates together via transient liquid phase bonding, comprising:
   providing two or more substrates to be joined together;
   disposing a sandwich bonding assembly between the substrates to be joined together, the sandwich bonding assembly comprising a powdered middle bonding layer sandwiched between two foil outer bonding layers, the powdered middle bonding layer comprising a powder having the following nominal composition: 60 wt. % Ni, 12.4 wt. % Cr, 18.5 wt. % Co, 3.2 wt. % Mo, 5.0 wt. % Al, 4.3 wt % Ti, 0.8 wt. % V, 0.1 wt. % Zr, 0.1 wt. To C, and 0.02 wt. % B, and each foil outer bonding layer comprising a sheet of nickel-based brazing foil having a nominal composition 79.3 wt. % nickel, 15.3 wt. % chromium, 1.5 wt. % iron, 0.1 wt. % cobalt, 0.1 wt. To titanium, 0.1 wt. % aluminum, 3.7 wt. % boron, 0.1 wt. % carbon;
   heating the sandwich bonding assembly and the substrates to a predetermined temperature such that the foil outer bonding layers melt, and the powdered middle bonding layer does not melt; and
   holding the sandwich bonding assembly and the substrates at the predetermined temperature for a predetermined amount of time.

9. The method of claim 8, wherein the predetermined temperature comprises a temperature above the melting point of the foil outer bonding layers, below the melting point of the powdered middle bonding layer, and below the melting point of each substrate.

10. The method of claim 8, wherein the predetermined amount of time comprises enough time to at least substantially melt the foil outer bonding layers.

11. The method of claim 10, wherein the predetermined amount of time further comprises an amount of time sufficient to form a joint between the substrates being joined together by allowing the melted foil outer bonding layers to solidify.

12. The method of claim 11, wherein the predetermined amount of time further comprises an amount of time sufficient to allow the joint to at least substantially homogenize.

13. The method of claim 8, wherein the predetermined amount of time comprises about 4 hours.

14. The method of claim 8, wherein similar substrates are joined together.

15. The method of claim 8, wherein dissimilar substrates are joined together.

16. The method of claim 15, wherein the dissimilar substrates comprise a single crystal substrate and a polycrystalline substrate.

17. A method for repairing a substrate via transient liquid phase bonding, comprising:
   positioning a sandwich bonding assembly in a desired location with respect to the substrate, the sandwich bonding assembly comprising a powdered middle bonding layer sandwiched between two foil outer bonding layers, the powdered middle bonding layer comprising a powder having the following nominal composition: 60 wt % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B, and each foil outer bonding layer comprising a sheet of nickel-based brazing foil having a nominal composition 79.3 wt. % nickel, 15.3 wt. % chromium, 1.5 wt. % iron, 0.1 wt. % cobalt, 0.1 wt. % titanium, 0.1 wt. % aluminum, 3.7 wt. % boron, 0.1 wt. % carbon:
   hearing the substrate and sandwich bonding assembly to a predetermined temperature such that the roil outer bonding layers melt, and the powdered middle bonding layer does not melt;
   holding the substrate and sandwich bonding assembly at the predetermined temperature for a predetermined amount of time.

18. The method of claim 17, wherein the predetermined temperature comprises a temperature above the melting point of the foil outer bonding layers, below the melting point of the powdered middle bonding layer, and below the melting point of the substrate.

19. The method of claim 17, wherein the predetermined amount of time comprises enough time to at least substantially melt the foil outer bonding layers.

20. The method of claim 19, wherein the predetermined amount of time further comprises an amount of time sufficient to form a joint between the substrates being joined together by allowing the melted foil outer bonding layers to solidify.

21. The method of claim 20, wherein the predetermined amount of time further comprises an amount of time sufficient to allow the joint to at least substantially homogenize.

22. The method of claim 17, wherein the predetermined amount of time comprises about 4 hours.

23. The method of claim 17, wherein the desired location comprises a crack.

24. The method of claim 17, wherein the substrate comprises a gas turbine engine component.

25. The method of claim 24, wherein the gas turbine engine component comprises at least one of: a hollow fan blade, an integrally bladed rotor, a high pressure turbine blade, a low pressure turbine blade, and a high pressure compressor blade.

26. The system of claim 1, wherein at least one substrate being bonded has a nominal composition comprising: 3-12 wt. % Cr, 0-3 wt. % Mo, 3-10 wt. % W, 0-5 wt. % Re, 6-12 wt. % Ta, 4-7 wt. % Al, 0-15 wt. % Co, 0-0.02 wt. % B, 0-0.1 wt. % Zr, 0-0.0045 wt. % C, 0-0.8 wt. % Hf, 0-2 wt. % Gb/Nb, 0-1 wt. % V, 0-0.7 wt. % Ti, 0-10 wt. % (Ru+Ir+Pt+Pd+Rh+Os), 0-0.1 wt. % (Y+La+Sc+Ce+lanthanides+actinides), balance Ni.

27. The system of claim 1, wherein at least one substrate being bonded has a nominal composition comprising: 60 wt. % Ni, 12.4 wt. % Cr, 18.5 wt. % Co, 3.2 wt. % Mo, 5.0 wt % Al, 4.3 wt. % Ti, 0.8 wt. % V, 0.1 wt. % Zr, 0.1 wt. % C, and 0.02 wt. % B.

28. The system of claim 1, wherein the composition of the middle bonding layer comprises a blended powder comprising a powder of each substrate being bonded.

29. The system of claim 28, wherein the blended powder comprises a blend of at least the following two powders:
   a first powder having a nominal composition comprising: 3-12 wt. To Cr, 0-3 wt. % Mo, 3-10 wt. % W, 0-5 wt. % Re, 6-12 wt. % Ta, 4-7 wt. % Al, 0-15 wt. % Co, 0-0.02 wt. % B, 0-0.1 wt. % Zr, 0-0.0045 wt. % C, 0-0.8 wt. % Hf, 0-2 wt. % Cb/Nb, 0-1 wt. % V, 0-0.7 wt. % Ti, 0-10 wt % (Ru+Ir+Pt+Pd+Rh+Os), 0-0.1 wt. % (Y+La+Sc+Ce+lanthanides+actinides), balance Ni; and
   a second powder having a nominal composition comprising: 60 wt. % Ni, 12.4 wt. % Cr, 18.5 wt % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

30. The sandwich bonding assembly of claim 7, wherein at least one substrate being bonded has a nominal composition comprising: 3-12 wt. % Cr, 0-3 wt. % Mo, 3-10 wt % W, 0-5 wt. % Re, 6-12 wt. % Ta, 4-7 wt. % Al, 0-15 wt. % Co, 0-0.02 wt. % B, 0-0.1 wt. % Zr, 0-0.0045 wt. % C, 0-0.8 wt. % Hf, 0-2 wt. % Gb/Nb, 0-1 wt. % V, 0-0.7 wt. % Ti, 0-10 wt. % (Ru+Ir+Pt+Pd+Rh+Os), 0-0.1 wt % (Y+La+Sc+Ce+lanthanides+actinides), balance Ni.

31. The sandwich bonding assembly of claim 7, wherein at least one substrate being bonded has a nominal composition comprising: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

32. The sandwich bonding assembly of claim 6, wherein the middle bonding layer comprises a blended powder comprising at least two powders.

33. The sandwich bonding assembly of claim 32, wherein the blended powder comprises at least the following two powders:
   a first powder having a nominal composition comprising: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B; and
   a second powder having a nominal composition comprising: 3-12 wt. % Cr, 0-3 wt. % Mo, 3-10 wt. % W, 0-5 wt. % Re, 6-12 wt. % Ta, 4-7 wt. % Al, 0-15 wt. % Co, 0-0.02 wt. % B, 0-0.1 wt. % Zr, 0-0.0045 wt. % C, 0-0.8 wt. % Hf, 0-2 wt. % Gb/Nb, 0-1 wt. % V, 0-0.7 wt. % Ti, 0-10 wt. % (Ru+Ir+Pt+Pd+Rh+Os), 0-0.1 wt % (Y+La+Sc+Co+lanthanides+actinides), balance Ni.

34. A system for bonding substrates via transient liquid phase bonding, comprising:
   two foil bonding layers, each comprising a sheet of nickel-based brazing foil having a nominal composition 79.3 wt. % nickel, 15.3 wt. % chromium, 1.5 wt. % iron, 0.1 wt. % cobalt, 0.1 wt. % titanium, 0.1 wt. % aluminum, 3.7 wt. % boron, 0.1 wt. % carbon;
   a powdered bonding layer disposed between the two foil bonding layers, the powdered bonding layer having the following nominal composition: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B,
   wherein the foil bonding layers melt during bonding, and the powdered bonding layer does not melt during bonding.

35. The system of claim 34, wherein the composition of the powdered bonding layer is substantially similar to a composition of a substrate being bonded.

36. The system of claim 34, wherein the powdered bonding layer comprises a blended powder comprising at least two powders.

37. The system of claim 36, wherein the blended powder comprises at least a powder of each substrate being bonded.

38. The method of claim 8, wherein the powdered middle bonding layer comprises a blended powder comprising at least two powders, wherein one powder has a nominal composition comprising: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

39. The method of claim 17, wherein the powdered middle bonding layer comprises a blended powder comprising at least two powders, wherein one powder has a nominal composition comprising: 60 wt. % Ni, 12.4 wt. % Cr, 18.5 wt. % Co, 3.2 wt. % Mo, 5.0 wt. % Al, 4.3 wt. % Ti, 0.8 wt. % V, 0.1 wt. % Zr, 0.1 wt. % C, and 0.02 wt. % B.

* * * * *